Figure 1:
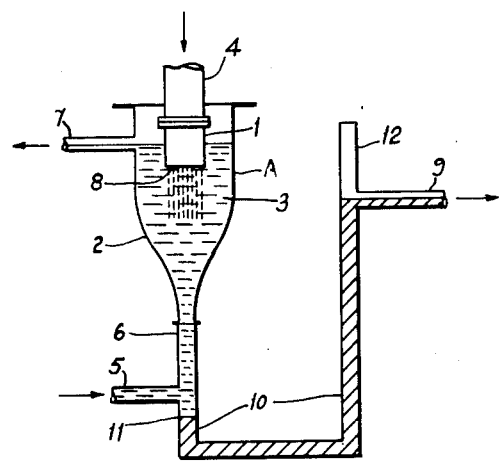

Oct. 19, 1965   M. W. BETTS ETAL   3,212,854
ESTIMATE OF HOP BITTER SUBSTANCE IN BEER
Filed July 31, 1962   2 Sheets-Sheet 1

FIG.I

*Inventors*
MAX WILLIAM BETTS
MOHD AKHTAR

By Howson and Howson
their   *Attorneys*

United States Patent Office 3,212,854
Patented Oct. 19, 1965

3,212,854
ESTIMATE OF HOP BITTER SUBSTANCE IN BEER
Max William Betts, Coventry, and Mohd Akhtar, Balsall Common, near Coventry, England, assignors to Courtaulds Limited, London, England, a British company
Filed July 31, 1962, Ser. No. 213,645
Claims priority, application Great Britain, Aug. 3, 1961, 28,189/61
25 Claims. (Cl. 23—230)

This invention relates to the extraction of substances which impart the distinctive bitter taste to beer and to their estimation.

It is thought that the distinctive bitter taste of beer is due to the presence of many substances. Among these substances are the isohumulones, for example isoadhumulone, isocohumulone and isohumulone. Various other substances also contribute to this bitter taste, for example the humulinic and isohumulinic acids, also a substance which has been called "hop aroma." The humulones and humulinic acids occur in hops but they are to a large degree isomerised to the corresponding isohumulones and isohumulinic acids during the boiling stage in the brewing processes. In the boiling stage, wort, that is the malt and water mixture, and hops are boiled to form hopped wort which is further processed to form beer.

In this specification by hop bitter substances we mean all isohumulones, and humulones as well as humulinic and isohumulinic acids as well as any other substances which may contribute to the bitter taste of beer. In this specification by the term "beer" (except where otherwise stated) we mean hopped wort or beer or any other liquid used in a brewing process whose hop bitter content is required to be known. We also intend the term "beer" to include any beer in the complete range from light beers such as lagers to heavy beers such as stouts.

The percentage of hop bitter substances in hops varies sufficiently to affect the bitterness of a beer, but until recently no satisfactory chemical method for estimating hop bitter substances was known. Therefore, to keep the bitterness of a beer produced constant, experts had to taste it during the brewing process and advise on what additions were needed. This not only made the product dependent on human judgment but also necessitated brewing beer in batches.

Several methods for the estimation of the hop bitter substances in beer involving solvent extraction have been described, but none of these methods is suitable for the rapid and accurate estimation of the hop bitter substances in beer which is necessary in a continuous brewing process. A recent device comprises using a continuously flowing counter-current extractor which gives continuous automatic extraction of the hop bitter substances in beer. The counter-current column used was about 60 cms. long.

However, in all these prior devices and methods a major problem has prevented their being used successfully over long periods on all types of beers, namely the formation of a stable emulsion which it is very difficult to break either by mechanical or chemical means. For example, to successfully break the emulsion in a stout by mechanical means we found that it was necessary to use a centrifuge operating at around 3,500 G. The present invention prevents the formation of an emulsion with all beers, including stouts.

According to the present invention a process for estimating the hop bitter substances in beer comprises passing beer through a water-insoluble solvent for the hop bitter substances, in such a manner that drops of beer are formed, said drops moving at a velocity less than that at which an emulsion is formed but at a velocity sufficient to cause turbulence inside the drops of beer so that more than 60 percent of the hop bitter substances passes from the beer to said water-insoluble solvent, continuously supplying and removing said water-insoluble solvent and estimating the percentage of hop bitter substances in the water-insoluble solvent removed.

The percentage of hop bitter substances in the water-insoluble solvent removed may be estimated by any convenient method. We prefer to use an ultra violet spectrophotometer to measure the absorption of the solution of the hop bitter substances. The solution in the water-insoluble solvent may be used direct or the hop bitter substances may be extracted into an alkali and then estimated in an ultra violet spectrophotometer.

In order to improve the partition coefficient of the hop bitter substances between the beer and the water-insoluble solvent, the beer is preferably acidified, prior to undergoing the process of the present invention. The preferred acids used are sulphuric acid or hydrochloric acid. We have found that to get the best results the pH of the beer solution should be less than about 3.5.

A large number of water-insoluble organic solvents effectively extract hop bitter substances from beer, but considerable quantities of accompanying materials may also be extracted which interfere with the subsequent spectrophotometric measurement. Hydrocarbon solvents such as light petroleum, hexane or iso-octane extract a relatively low amount of these interfering substances compared with extractions using chloroform or diethyl ether. Preferably the water-insoluble solvent used is optically suitable iso-octane.

The beer (here the term "beer" is used to exclude hopped wort which is already degassed) must be thoroughly degassed by any convenient method.

The peak optical density of a neutral solution of hop bitter substances and water-insoluble solvent occurs at 275μ. An alkaline solution of hop bitter substances and water-insoluble solvent has a peak optical density at 255μ. We prefer to carry out the ultra violet spectrophotometer analysis on an alkaline solution, since the interference of any background effect is reduced at this wavelength, and also because the lamps for generating this wavelength generally have a much longer life than those used for generating a wavelength of 275μ.

A method of making the solution of hopped bitter substances alkaline is to add aqueous alkali, for example caustic soda, to the solution followed by mixing. We prefer to pass this mixture to a separator, for example a gravity separator, whereupon pure or nearly pure water-insoluble solvent is separated leaving a solution of hop bitter substances and alkali to be passed to the ultra violet spectrophotometer. If necessary further alkali may be added after the separation step.

The temperature at which the extraction takes place will of course have an effect on the partition coefficient of the hop bitter substances between beer and the water-insoluble solvent, however, we have found it quite convenient to operate the process at room temperature.

Previous methods of extracting hop bitter substances from beer have involved the use of a counter-current flow column. We have found that substantially the same percentage of hop bitter substances can be extracted by using the process of our invention by using a comparatively short chamber which we call a jet chamber. A jet chamber of as short as 2½ inches has been found to have an extraction efficiency of the same order as that obtained by using a counter-current flow column over 8 feet long. However, we prefer to use a jet chamber 3 inches to 4 inches long, especially when extracting from a stout.

Instead of operating on the counter-current flow principle our extraction process depends on the turbulence created in the beer droplets by the velocity with which they emerge from the orifices into the jet chamber and pass through the water-insoluble solvent. This velocity must be very carefully regulated. If, for instance, the beer droplets have a Reynolds number of above about 2,000, cavitation will occur in the water-insoluble solvent and an emulsion will be formed. This emulsion as previously stated is very difficult to break and its formation must be prevented, hence the beer droplets must initially have a Reynolds number below about 2,000. On the other hand, if the velocity of the beer drops is too low, only the beer at the surface of the beer drops will ever be in contact with the water-insoluble solvent and all the hop bitter substances in the centre of the drops will remain in the beer. The velocity of the drops must therefore be high enough to create turbulence inside the said drops. By turbulence in this context we mean that there is a continuous circulation of beer inside the drops to and from the surface of said drops. This will result in equilibrium, as defined by the partition coefficients of the hop bitter substances between beer and the water-insoluble solvent, being approached very rapidly. As far as we can gather turbulence occurs inside the beer drops to a useful degree for our purposes provided that the drops have a Reynolds number of over 70.

Any method of creating drops and passing them at a suitable velocity, as defined above, through a water-insoluble solvent may be used in the process of this invention. For example the beer may be passed into the water-insoluble solvent through a jet head containing one or more jets. Another method which may be employed is to pass a stream of beer substantially towards the centre of a rapidly rotating plate immersed in the water-insoluble solvent which sends drops of beer outwards from its circumference.

It is not necessary to obtain 100 percent extraction of the hop bitter substances from beer in order to obtain a useful result, provided the process results in a substantially similar percentage of the hop bitter substances being extracted every time a beer containing approximately the same percentage of hop bitter substances, for example a stout, is passed through the apparatus.

If the beer is passed through a small jet it is essential that the beer does not contain any particles of solid matter having a diameter of over about half the diameter of the orifices used, otherwise the orifices are likely to become blocked easily. The particles in the beer may be removed by any convenient filtering process, for example by centrifuging or by using a mesh filter.

Having now described the general principle of the invention two forms of apparatus used in the process of this invention are shown by way of example in the accompanying drawings, the two figures of which are respectively diagrammatic sectional elevations of the two forms of apparatus.

Referring first to FIGURE 1, a jet head 1 is situated in a jet chamber 2 which tapers toward its lower extremity. The jet head which contains a suitable number of small jets 8 is attached to a beer inlet 4 located below the surface of the water-insoluble solvent 3. The water-insoluble solvent is fed to the jet chamber 2 via an inlet 5 and a pipe 6. The solution of hop bitter substances in the water-insoluble solvent is led away via an outlet pipe 7. The beer is led into the apparatus through the pipe 4, the jet head 1 and the jets 8 at a suitable speed as hereinbefore defined. The beer passes down through the water-insoluble solvent in the jet chamber 2 and the pipe 6 and eventually out through the outlet 9 having had a substantial percentage of its hop bitter substances removed. The beer in the pipe 10 acts as a hydrostatic balancing column. The beer level 11 in this hydrostatic balancing column must be such that it does not rise above the water-insoluble solvent inlet 5. The apparatus is also provided with an anti-syphon pipe 12.

From the outlet pipe 7 the solution of hop bitter substances in the water-insoluble solvent is either passed direct to an ultra violet spectrophotometer or alternatively the hop bitter substances are extracted into an aqueous alkaline solution in an extractor prior to being passed to an ultra violet spectrophotometer.

In one example of this apparatus the jet chamber was circular with a diameter of ¾ inch at A tapering to the top of the water-insoluble solvent inlet pipe 6. The jet chamber was 2½ inches long. Using this apparatus and method it was possible to extract 75 percent of the hop bitter substances from 10 ccs. per minute of a 50/50 volume/volume mixture of a stout and half normal sulphuric acid using a platinum jet having six holes each having a diameter of 0.004 inch. In this apparatus, using this flow rate, we preferably use holes of from .002 inch to .006 inch; however we have successfully used holes having diameters outside this range. As previously mentioned the beer must be filtered so as to remove particles having a diameter larger than the radius of each jet hole.

Figure 2:
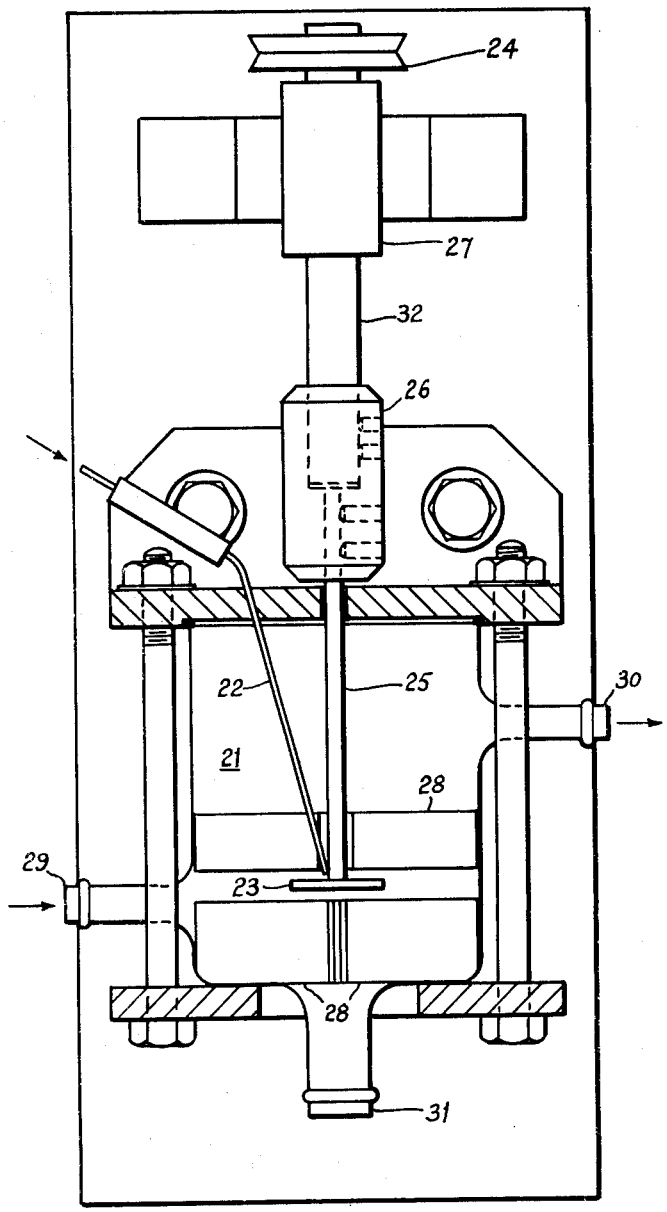

FIGURE 2 shows a second type of apparatus using the present invention. The beer is led into a chamber 21 via a thin inlet pipe 22. The inlet pipe 22 ends near the centre of a rapidly rotating plate 23 and pointing substantially towards the centre of the plate. The plate is driven via a drive pulley 24 and a shaft 32, said shaft being supported by a bearing 26 and joined by a coupling 27 to a shaft 25 connected to the plate. The chamber is provided with baffles 28 situated above and below the rotating plate 23. The chamber is also provided with a water-insoluble solvent inlet 29, an outlet 30 for the solution of hop bitter substances in the water-insoluble solvent, and an outlet 31 for the spent beer. The baffles 28 serve to prevent the entire contents of the chamber being rotated by the action of the plate and also to prevent the contents of the pipe 31 tending to be sucked back into the chamber. From the outlet pipe 30 the solution of hop bitter substances in the water insoluble solvent is treated in a similar manner to that described for the solution from the pipe 7 in FIGURE 1.

The beer passes in a thin stream from the pipe 22 onto the upper surface of the rotating plate 23 where it forms a thin substantially continuous film from which, depending on the speed of the plate, drops of beer are thrown off at a suitable speed into the water-insoluble solvent. The drops are actually formed at the circumference of the plate.

For the extraction of hop bitter substances from 10 ccs. per minute of a 50/50 volume/volume mixture of a stout and half normal sulphuric acid the inlet pipe 22 may conveniently have a diameter of 0.016 inch. The plate was of ¾ inch diameter and there was 1 inch clearance between the plate and the walls of the chamber. The plate was revolved at 5,000 r.p.m. Using this apparatus and method it was possible to extract 75 percent of the hop bitter substances from a stout.

We have experimented with inlet pipes for the beer of various diameters; above 0.025 inch diameter the beer forms drops when flowing at the rate of 10 ccs. per minute and an inlet pipe of smaller than 0.005 inch diameter, with a similar flow rate, results in fine drops being formed at the end of the pipe, and an emulsion is formed. We have successfully used holes of between 0.012 to 0.020 inch diameter for a flow rate of 10 ccs. per minute.

The clearance between the edge of the revolving plate 23 and the walls of the chamber 21 should be such that there is adequate extraction of the hop bitter substances.

What we claim is:

1. A process for estimating the hop bitter substances in beer comprising passing beer in the form of droplets and in continuous manner, through a water-insoluble solvent for the hop bitter substances at a velocity such that the Reynolds number of the droplets lies within the range from 70 to 2000, whereby formation of an emulsion is avoided, continuously supplying and removing said water-insoluble solvent and estimating the percentage of hop bitter substances in the water-insoluble solvent removed.

2. A process as claimed in claim 1, in which the percentage of hop bitter substances in the water-insoluble solvent is estimated by passing the solution of hop bitter substances in the water-insoluble solvent to an ultra violet spectrophotometer in which the absorption of the solution is measured.

3. A process as claimed in claim 2, in which the beer is initially acidified with an acid.

4. A process as claimed in claim 3, in which the acid used is sulphuric acid.

5. A process as claimed in claim 4, in which the beer is a stout.

6. A process for estimating the hop bitter substances in beer comprising passing beer in the form of droplets and in continuous manner, through a water-insoluble solvent for the hop bitter substances at a velocity such that the Reynolds number of the droplets lies within the range from 700 to 2000, whereby formation of an emulsion is avoided, continuously supplying and removing said water-insoluble solvent and estimating the percentage of hop bitter substances in the water-insoluble solvent removed by extracting the hop bitter substances from the water-insoluble solvent by mixing with an aqueous alkali, separating the water-insoluble solvent and passing this solution of the hop bitter substances in aqueous alkali to an ultra violet spectrophotometer in which the absorption of the solution is measured.

7. A process as claimed in claim 6, in which the beer is initially acidified with an acid.

8. A process as claimed in claim 7, in which the acid used is sulphuric acid.

9. A process as claimed in claim 8, in which the beer is a stout.

10. A process as claimed in claim 1 for estimating the hop bitter substances in beer comprising passing beer through one or more jets into a water-insoluble solvent for the hop bitter substances in such a manner that drops of beer are formed, said drops moving at a velocity less than that at which an emulsion is formed but at a velocity sufficient to cause turbulence inside the drops of beer so that more than 60 percent of the hop bitter substances passes from the beer drops into said water-insoluble solvent, continuously supplying and removing said water-insoluble solvent and estimating the percentage of hop bitter substances in the water-insoluble solvent removed.

11. A process as claimed in claim 10, in which the percentage of hop bitter substances in the water-insoluble solvent is estimated by passing the solution of hop bitter substances in the water-insoluble solvent to an ultra violet spectrophotometer in which the absorption of the solution is measured.

12. A process as claimed in claim 10, in which the percentage of hop bitter substances in the water-insoluble solvent removed is estimated by extracting the hop bitter substances from the water-insoluble solvent by mixing with an aqueous alkali, separating the water-insoluble solvent and passing this solution of the hop bitter substances in aqueous alkali to an ultra violet spectrophotometer in which the absorption of the solution is measured.

13. A process as claimed in claim 10, in which the water-insoluble solvent used is a liquid hydrocarbon.

14. A process as claimed in claim 13, in which the water-insoluble solvent used is an optically suitable iso-octane.

15. A process as claimed in claim 1 for estimating the hop bitter substances in beer comprising passing a stream of beer onto a rapidly rotating plate situated in a water-insoluble solvent for the hop bitter substances so that the drops of beer move away from the edge of said rapidly rotating plate at a velocity less than that at which an emulsion is formed but at a velocity sufficient to cause turbulence inside the drops of beer so that more than 60 percent of the hop bitter substances passes from the beer drops into said water-insoluble solvent, continuously supplying and removing said water-insoluble solvent and estimating the percentage of hop bitter substances in the water-insoluble solvent removed.

16. A process as claimed in claim 15, in which the percentage of hop bitter substances in the water-insoluble solvent is estimated by passing the solution of hop bitter substances in the water-insoluble solvent to an ultra violet spectrophotometer in which the absorption of the solution is measured.

17. A process as claimed in claim 15, in which the percentage of hop bitter substances in the water-insoluble solvent removed is estimated by extracting the hop bitter substances from the water-insoluble solvent by mixing with an aqueous alkali, separating the water-insoluble solvent and passing this solution of the hop bitter substances in aqueous alkali to an ultra violet spectrophotometer in which the absorption of the solution is measured.

18. A process as claimed in claim 15, in which the water-insoluble solvent used is a liquid hydrocarbon.

19. A process as claimed in claim 18, in which the water-insoluble solvent used is an optically suitable iso-octane.

20. A process for estimating the hop bitter substances in beer comprising passing a solution of beer in acid, said solution having a pH of less than 3.5, through one or more jets into optically suitable iso-octane so that drops of said solution are formed, said drops moving at a velocity such that the Reynolds number of the droplets lies within the range from 70 to 2000, whereby an emulsion is avoided but the velocity is sufficient to cause turbulence inside said drops so that more than 60 percent of the hop bitter substance passes from said drops into said iso-octane, continuously supplying and removing said water-insoluble solvent and estimating the percentage of hop bitter substances in said iso-octane.

21. A process as claimed in claim 20, in which the percentage of hop bitter substances in the iso-octane is estimated by passing the solution of hop bitter substances in said iso-octane to an ultra violet spectrophotometer in which the absorption of the solution is measured.

22. A process as claimed in claim 20, in which the percentage of hop bitter substances in the iso-octane is estimated by extracting the hop bitter substances from said iso-octane by mixing with an aqueous alkali, separating said iso-octane and passing this solution of the hop bitter substances in aqueous alkali to an ultra violet spectrophotometer in which the absorption of the solution is measured.

23. A process for estimating the hop bitter substances in beer comprising passing a stream of a solution of beer in acid, said solution having a pH of less than 3.5, onto a rapidly rotating plate situated in an optically suitable iso-octane so that drops of beer move away from the edge of said rapidly rotating plate, said drops moving at a velocity such that the Reynolds number of the droplets lies within the range from 70 to 2000, whereby an emulsion is avoided but the velocity is sufficient to cause turbulence inside said drops so that more than 60 percent of the hop bitter substances passes from said drops into said iso-octane, continuously supplying and removing said water-insoluble solvent and estimating the percentage of hop bitter substances in said iso-octane.

24. A process as claimed in claim 23, in which the percentage of hop bitter substances in the iso-octane is estimated by passing the solution of hop bitter substances in said iso-octane to an ultra violet spectrophotometer in which the absorption of the solution is measured.

25. A process as claimed in claim 23, in which the percentage of hop bitter substances in the iso-octane is estimated by extracting the hop bitter substances from said iso-octane by mixing with an aqueous alkali, separating said iso-octane and passing this solution of the hop bitter substances in aqueous alkali to an ultra violet spectrophotometer in which the absorption of the solution is measured.

References Cited by the Examiner

UNITED STATES PATENTS

| | | | |
|---|---|---|---|
| 1,149,704 | 8/15 | Wahl | 99—50.5 |
| 1,992,133 | 2/35 | Tarte. | |
| 2,139,871 | 12/38 | Wilson et al. | 23—270.5 X |
| 2,176,899 | 10/39 | Gordon et al. | 23—270.5 |

FOREIGN PATENTS 380,954   9/32   Great Britain.

OTHER REFERENCES

Alderton et al.: "Anal. Chem." 26 983–992 (1954).

Klopper: "Institute of Brewing Journal" 61 425, 426 (1955).

MORRIS O. WOLK, *Primary Examiner.*

DELBERT E. GANTZ, *Examiner.*

UNITED STATES PATENT OFFICE

CERTIFICATE OF CORRECTION

Patent No. 3,212,854                        October 19, 1965

Max William Betts et al.

It is hereby certified that error appears in the above numbered patent requiring correction and that the said Letters Patent should read as corrected below.

Column 2, lines 37, 38 and 44, for "$\mu$", each occurrence, read -- $m\mu$ --.

Signed and sealed this 31st day of January 1967.

(SEAL)
Attest:

ERNEST W. SWIDER                        EDWARD J. BRENNER
Attesting Officer                            Commissioner of Patents